US007103066B2

(12) United States Patent
Roy (10) Patent No.: US 7,103,066 B2
(45) Date of Patent: Sep. 5, 2006

(54) METHOD AND APPARATUS FOR PROVIDING COMMON INTELLIGENT VALUE-ADDED SERVICE PROTOCOLS FOR ACCESSING VALUE-ADDED SERVICES BY ALL MULTIMEDIA APPLICATION PROTOCOLS

(75) Inventor: Radhika R. Roy, Howell, NJ (US)

(73) Assignee: AT&T Corp., New York, NY (US)

( * ) Notice: Subject to any disclaimer, the term of this patent is extended or adjusted under 35 U.S.C. 154(b) by 817 days.

(21) Appl. No.: 09/974,789

(22) Filed: Oct. 12, 2001

(65) Prior Publication Data

US 2002/0067732 A1    Jun. 6, 2002

Related U.S. Application Data

(60) Provisional application No. 60/239,695, filed on Oct. 12, 2000.

(51) Int. Cl.
*H04J 3/16* (2006.01)
(52) U.S. Cl. .................. 370/466; 370/410; 370/401; 370/352
(58) Field of Classification Search ............ 370/352, 370/389, 392, 390, 401, 468, 463, 410
See application file for complete search history.

(56) References Cited

U.S. PATENT DOCUMENTS

| | | | | |
|---|---|---|---|---|
| 5,936,578 | A * | 8/1999 | Driessen et al. ............ 342/374 |
| 5,943,408 | A | 8/1999 | Chen et al. .................. 379/207 |
| 5,999,525 | A * | 12/1999 | Krishnaswamy et al. ... 370/352 |
| 6,426,957 | B1 * | 7/2002 | Hauser et al. ............... 370/413 |
| 6,594,246 | B1 * | 7/2003 | Jorgensen ................... 370/338 |
| 6,606,302 | B1 * | 8/2003 | Delattre et al. .......... 370/230.1 |
| 6,650,619 | B1 * | 11/2003 | Schuster et al. ............ 370/230 |
| 6,714,987 | B1 * | 3/2004 | Amin et al. ................. 709/249 |
| 6,769,000 | B1 * | 7/2004 | Akhtar et al. ........... 707/103 R |
| 6,829,474 | B1 * | 12/2004 | Adachi ..................... 455/414.1 |
| 6,854,014 | B1 * | 2/2005 | Amin et al. ................. 709/227 |
| 6,856,676 | B1 * | 2/2005 | Pirot et al. ............. 379/201.01 |

OTHER PUBLICATIONS

F. Imhoff: *Efficient Integration and Translation of Value Added Services for Converging Networks Using Middleware Platforms*, 9th Inter. Conf. On Computer Communication and Networks, Oct. 200, pp. 164-169.

H.F. Badran: *Service Provider Networking Infrastructures With MPLS*, 6th IEEE Symposium on Computers and Communication, 2001, pp. 312-318.

* cited by examiner

*Primary Examiner*—Ajit Patel
*Assistant Examiner*—Andrew C. Lee
(74) *Attorney, Agent, or Firm*—Michael Haynes PLC (57) ABSTRACT

A novel method of and system for providing common value-added services for two-way point-to-point, multi-point-to-multi-point, point-to-multi-point, and/or multi-point-to-point real-time communications using various communication protocols. The present invention provides common value-added service protocols for receiving a request from a first of a multiple of communication protocol sources for a first value-added service using the first common value-added service protocol, and providing the requested first value-added service to the first communication protocol source using the first common value-added service protocol. The present invention further includes receiving a request from a second of the multiple communication protocol sources for the first value-added service using the first common value-added service protocol, and providing the requested first value-added service to the second communication protocol source using the first common value-added service protocol.

34 Claims, 6 Drawing Sheets

METHOD AND APPARATUS FOR PROVIDING COMMON INTELLIGENT VALUE-ADDED SERVICE PROTOCOLS FOR ACCESSING VALUE-ADDED SERVICES BY ALL MULTIMEDIA APPLICATION PROTOCOLS

CROSS REFERENCE TO RELATED APPLICATIONS

This application claims the benefit under 35 U.S.C. § 119(e) of U.S. Provisional Application No. 60/239,695, filed Oct. 12, 2000.

TECHNICAL FIELD

The present invention relates to providing a common protocol for value-added service in multimedia applications. More specifically the present invention relates to providing common value-added service protocols to access the value-added services for calls originated using each of the multimedia application protocols, for example, H.323, H.310, H.324, and other multimedia application protocols.

BACKGROUND OF THE INVENTION

The International Telecommunication Union (ITU) Working Party 2 (WP2) of Study Group 16 (SG16) has developed and promulgated widely accepted standards for multimedia protocols for systems/terminals/application, for example, H.323, H.310, H.324. H.323 provides the real-time multimedia (audio, video, and/or data [text, still images and/or graphics]) communications over packet-based networks (e.g., Internet/Internet Protocol [IP], Asynchronous Transfer Mode [ATM], and Frame Relay [FR]). H.310 provides the real-time multimedia (audio, video, and/or data [text, still images and/or graphics]) communications optimized over the Asynchronous Transfer Mode (ATM) network only. H.324 provides the real-time multimedia (audio, video, and/or data [text, still images and/or graphics]) communications over the circuit-switched network line Public Switched Telephone Network (PSTN). These multimedia applications use common audio (G-series) and video (H-series) codecs as well as data (T-12x series) protocol standards.

In addition to the above-identified multimedia protocols, WP2 of SG16 (WP2/16) has developed a common control standard, Control Protocol for Multimedia Communication, which is also known as H.245. The H.245 control protocol is an end-to-end protocol and is used by all multimedia application protocols (including, for example, H.323, H.310, H.324), and others for controlling media, for example, audio, video, and/or data (such as text, still images, and/or graphics) between, user terminals.

However, H.323, H.310, H.324 and other multimedia protocol systems/terminals/applications often need additional value-added services to enable communications between users on the system. These value-added services can include, for example, Policy, Security, Directory, Billing/Accounting, Visitor/Home Location Functions, and others, and can be implemented as front-end services (FES) and/or as backend services (BES). In general, the above value-added services are implemented as BES and are used to provide information and resources necessary for call completion. An example of a common front-end protocol is a H.245 protocol standard, which was developed to be used with all of the above listed multimedia protocol systems/terminals/applications.

The characteristic control functions performed by the H.245 protocol can be summarized as follows:

Master-slave determination;
Capability exchange;
Bi-directional logical channel signaling;
Mode request;
Round trip delay determination;
Maintenance loop detection; and
Specific user commands and indications.

Because these characteristic control functions are common to all applications, H.245 was developed as a common control protocol for all of the applications without making it application-specific. This design characteristic has provided a very efficient and solid common foundation for the optimization of resources for both equipment manufacturers and service providers. As a result, separate control and services protocols do not need to be provided for each application.

Although each multimedia application protocol, for example, H.323, H.310, or H.324, has been standardized, each of these protocol use a unique protocol for requesting and communicating with the servers providing the value-added services. Specifically, functional entities, such as, multi-point controllers (MCUs), gateways (GWs), media gateway controllers (MGCs), and/or gatekeepers (GKs) operating using a given multimedia application protocol communicate with each other and the value-added service servers using a unique protocol known as an application-specific protocol. For example, the H.323 system uses its own H.323 protocol to communicate with its own terminals, GKs, MCUs, GWs, and MGCs. The same is the case for the H.310, H.324 and other multimedia application protocols. Unfortunately, none of these application-specific protocols are compatible with each other.

Similarly, since each application may need additional value-added services such as Policy, Security, Directory, Billing/Accounting, Visitor/Home Location Functions, and others, separate application-specific communication protocols are currently required for each multimedia application protocol to request and communicate with the value-added services. Fortunately, since these services are generally provided as application layer value-added services, the services do not need to be application-specific and, thus, can be implemented as common functions that are directly accessible by all application protocols using a common communication protocol.

Therefore, the development of non-application-specific common communication protocols that can be used by all multimedia application protocols to support each value-added service would be desirable.

SUMMARY OF THE INVENTION

A novel method of and system for providing common value-added services for two-way point-to-point, multi-point-to-multi-point, point-to-multi-point, and/or multi-point-to-point real-time communications using various communication protocols. The present invention provides common value-added service protocols for receiving a request from a first of a multiple of communication protocol sources for a first value-added service using the first common value-added service protocol, and providing the requested first value-added service to the first communication protocol source using the first common value-added service protocol. The present invention further includes receiving a request from a second of the multiple communication protocol sources for the first value-added service using the first common value-added service protocol, and providing the requested first value-added service to the second communication protocol source using the first common value-added service protocol.

DETAILED DESCRIPTION

The present invention is a novel method of and system for providing common value-added services for two-way point-to-point, multi-point-to-multi-point, point-to-multi-point, and/or multi-point-to-point real-time communications using various communication protocols. Although the present invention provides the most benefit to two-way point-to-point, multi-point-to-multi-point, point-to-multi-point, and/or multi-point-to-point real-time communications using different communication protocols, it is equally applicable to two-way point-to-point, multi-point-to-multi-point, point-to-multi-point, and/or multi-point-to-point real-time communications using the same communication protocol. Although numerous specific details are set forth in the following detailed description to provide a thorough understanding of the present invention, it will be evident to one of ordinary skill in the art that these specific details are not needed in order to practice the present invention.

Figure 1:
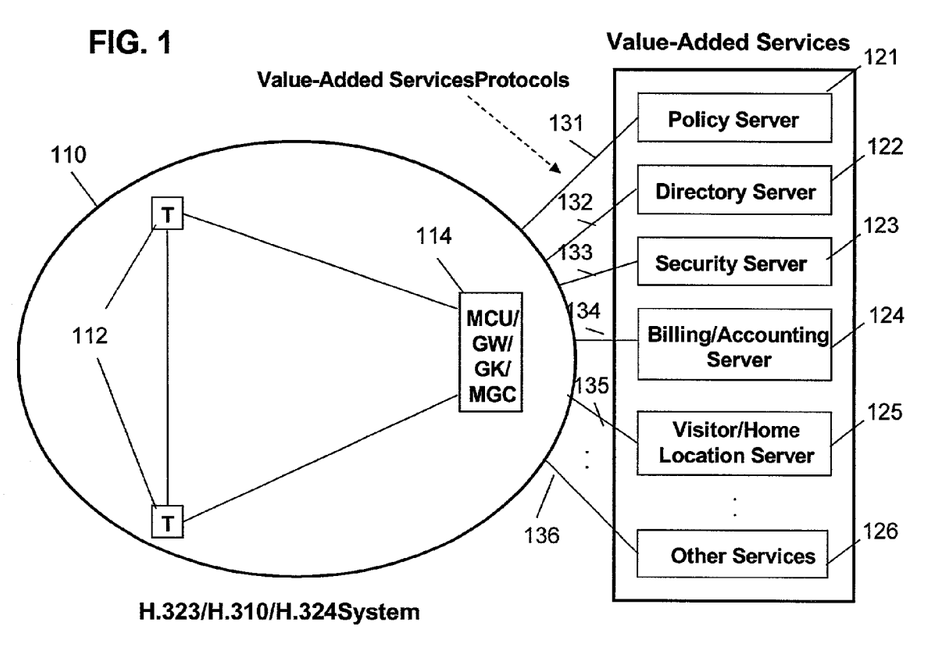
FIG. 1 is a high-level system block diagram of a multimedia application system that shows the generic relationship between a multimedia application protocol system and multiple value-added service protocols for communicating with value-added services to implement two-way, real-time communications, in accordance with an embodiment of the present invention.

FIG. 1 shows a high-level block diagram that illustrates a relationship between a multimedia application protocol system 110, multiple value-added service servers 121, 122, 123, 124, 125, 126 and multiple value-added service protocols 131, 132, 133, 134, 135, 136 for enabling two-way point-to-point, multi-point-to-multi-point, point-to-multi-point, and/or multi-point-to-point real-time communications between the multimedia application protocol system 110 and the value-added service servers 121–126. Specifically, FIG. 1 shows that any functional entity 112, 114, can communicate with (that is, request and receive from) a value-added service server using a common value-added service protocol, regardless of the underlying multimedia application protocol used to implement the entity, in accordance with an embodiment of the present invention.

In general, in accordance with an embodiment of the present invention, each value-added service protocol can be specific to a given value-added service. For example, a policy value-added service can use a common policy value-added service protocol for communicating with each of the multimedia application protocol systems. Similarly, each of the Security, Directory, Billing/Accounting, Visitor/Home Location Functions, and other services can have their own specific value-added service protocols. Each service can be implemented as either a front-end service (FES) or a back-end service (BES).

In accordance with an alternate embodiment of the present invention, an intelligent single common value-added service protocol can be implemented that would receive all requests for and control the provision of the value-added services from each of the value-added service servers 121–126.

In accordance with an embodiment of the present invention, in FIG. 1, the multimedia application protocol system 110 is shown to include one or more terminals 112 and at least one functional communication entity 114 in communication with each other and using one of an H.323, an H.310 and an H.324 application protocol. Also, in FIG. 1, several value-added service servers, namely, a policy server 121, a directory server 122, a security server 123, a billing/accounting server 124, a visitor/home location server 125 and one or more other service servers 126 are shown to be separately in communication with the multimedia application protocol system 110. Specifically, the policy server 121 is shown to be in communication with the multimedia application protocol system 110 via a policy value-added service protocol 131, the directory server 122 is shown to be in communication with the multimedia application protocol system 110 via a directory value-added service protocol 132, the security server 123 is shown to be in communication with the multimedia application protocol system 110 via a security value-added service protocol 133, the billing/accounting server 124 is shown to be in communication with the multimedia application protocol system 110 via a billing/accounting value-added service protocol 134, the visitor/home location server 125 is shown to be in communication with the multimedia application protocol system 110 via a visitor/home location value-added service protocol 135, and the other value-added services servers 126 are, generally, shown to be in communication with the multimedia application protocol system 110 via a one or more other value-added service protocols 136.

Each of the servers (121 through 126) contains the necessary functionality and resources to provide an associated value-added service. For example, the policy server 121 contains the specific policy functionality and resources to provide the policy value-added service using the policy value-added service protocol 131. In this embodiment, the policy value-added service protocol 131 is able to directly communicate with whichever multimedia application protocol is being used by the generic multimedia communication system 110.

Although for reasons of clarity FIG. 1 only shows a single multimedia application protocol system 110 to illustrate the general concept of the present invention, it should be understood that separate multimedia application protocol systems 110 can be simultaneously supported by each of the value-added service protocols.

In general, when a user places a call from one of the terminals 112 to an other one of the terminals 112, the call set up request is sent to the entity 114, for example a GK 114, and the GK 114 determines what, if any, additional information and/or resources, that is, value-added services, are required. If any of these value-added services are required, the GK 114 sends a request to the appropriate value-added service server, for example, the policy server 121, via the policy value-added service protocol 131. The policy server 121 receives the request and determines the appropriate service policy that is to be used for the call and provides the necessary information, via GK 114, back to the calling terminal 112. This information can be provided as a token, a certificate or in some other equivalent form. The calling terminal 112 uses the provided policy information to establish and conduct the call with the other terminal 112. It is understood that additional value-added services can be requested/provided from any and/or all of the other policy servers (122 through 126) to establish and conduct the call.

In accordance with the embodiment of the present invention, in FIG. 1, each value-added service can be implemented on separate value-added service servers 121–126 and any functional entity 112, 114 in a given multimedia application protocol can use the services from this server. As a result, since each value-added service is not application-specific, it can be implemented independently of both the protocol characteristics of the multimedia application protocol and the transmission characteristics of the underlying transport networks. This is true for all transport networks, regardless of whether they are packet-switched (e.g., Internet/IP, ATM, FR), circuit-switched (e.g., PSTN), connection oriented (e.g., connections attributes of packets/cells/circuit of ATM, FR, PSTN), or connectionless (e.g., connectionless attributes of datagram packets of Internet/IP).

To further explain the present embodiment of the present invention, the following discussion describes on how the policy server 121 can manage a set of rules that have been circulated to the various entities 112, 114 of the system 110 so that they can classify, police and enforce a set of behaviors for applications, users and groups to provide the policy value-added service. The set of rules may include service level agreements (SLA) to provide services for the multimedia application protocols over any networks that are being performed among the service providers including availability, Quality-of-Service (QOS), traffic scheduling, queuing, discarding, throttling, security criteria, and many others. The policy server 121 can be stateful or stateless.

For example, a possible candidate for the policy value-added service protocol 131 can be the International Engineering Task Force's (IETF's) Common Open Policy Service (COPS). In addition, any one of the existing multimedia application protocols can also be used provided the value-added policy requirements can be met by the existing multimedia application protocol.

Similarly, the directory service provided by the directory server 122 has a wide range of use by the multimedia application protocols and other services. For example, policy information must be stored in a manner that supports heterogeneous networking environments for the applications. The policy information frequently needs to be immediately available so that the system entities 112, 114 can make split-second decisions to satisfy the two-way, real-time needs of the communicating users. At the same time, the policy information can also be replicated throughout the network to ensure high availability.

The directory server 122 offers an optimal system for storing the data needed to manage bandwidth because it is, generally, a database that is optimized for reading information for use by the multimedia application protocols as a series of attributes and values.

Similar to the policy protocol, an existing directory protocol (Lightweight Directory Access Protocol (LDAP), Directory Enabled Network (DEN), and/or Directory Protocol-X.500) with extensions as well as a new directory protocol 132 can be used by all applications.

The security server 123 can provide the authentication and authorization functions for both fixed and mobile users of any multimedia application protocol. For example, an existing ITU-T H.235 security protocol can be used as the security protocol 135 for all applications, either as is or with extensions where applicable. For example, a user can place a call from a terminal 112 and the call can be routed to an entity 114, for example, a GK 114, and the GK 114 can communicate with the security value-added service server 123 for authentication/authorization of the user. The security server can then allocate a security token indicating whether the user has been authenticated/authorized. In accordance with an embodiment of the present invention, the same security token can be used by all users, regardless of which multimedia application protocol is used at the application layer.

A subscription service can be used to enable access to each value-added service regardless of whether a user of a multimedia application protocol system is fixed or mobile. In accordance with another embodiment of the present invention, the subscription service can be replaced by a periodic payment service, a per call and other service charge service, and possibly a fixed initial subscription fee service. The collection of the corresponding revenue is vital for the operators, as well as the accuracy of the service charges.

Therefore, the billing/accounting server 124 can provide a standard-based billing/accounting service for whichever type of service is desired. The billing/accounting service can include SLA, policy, traffic-dependent/independent charges, recording mechanisms, and many of the other criteria required for billing and accounting. A standard billing and accounting protocol 134 can be used by all of the multimedia application protocols, for example, H.323, H.310, H.324, IMT-2000, and other protocols.

The visiting/home location server 125 can provide the services related to the location information of a mobile user when the mobile user is visiting in a foreign location. Thus, the visiting/home location server 125 can provide information on the mobile users. Specifically, this information can include where the mobile users subscribe for the mobile services and keep their service profiles as their designated home location, and services that are to be provided to the mobile users in the foreign visiting location need to be verified from its home location server. In general, these are the databases in charge of the management of the calls.

Authentication and authorization functions can also be coupled with the visiting/home location service. For example, existing European and North American cellular wireless VLR/HLR protocol standards can be used for the mobile users of all applications (e.g., H.323, H.310, H.324, IMT-2000, and others). If needed, the existing VLR/HLR protocols can also be extended to meet the requirements of individual applications.

It should of course be understood that, in accordance with an alternate embodiment of the present invention, it is possible to implement all of the separate server functions on a single integrated server either using each of the individual common value-added service protocols or using a single integrated common value-added service protocol. Similarly, in accordance with another embodiment of the present invention, all of the separate server functions can be implemented on multiple, distributed integrated servers either using each of the individual common value-added service protocols or using the single, integrated common value-added service protocol.

Figure 2:
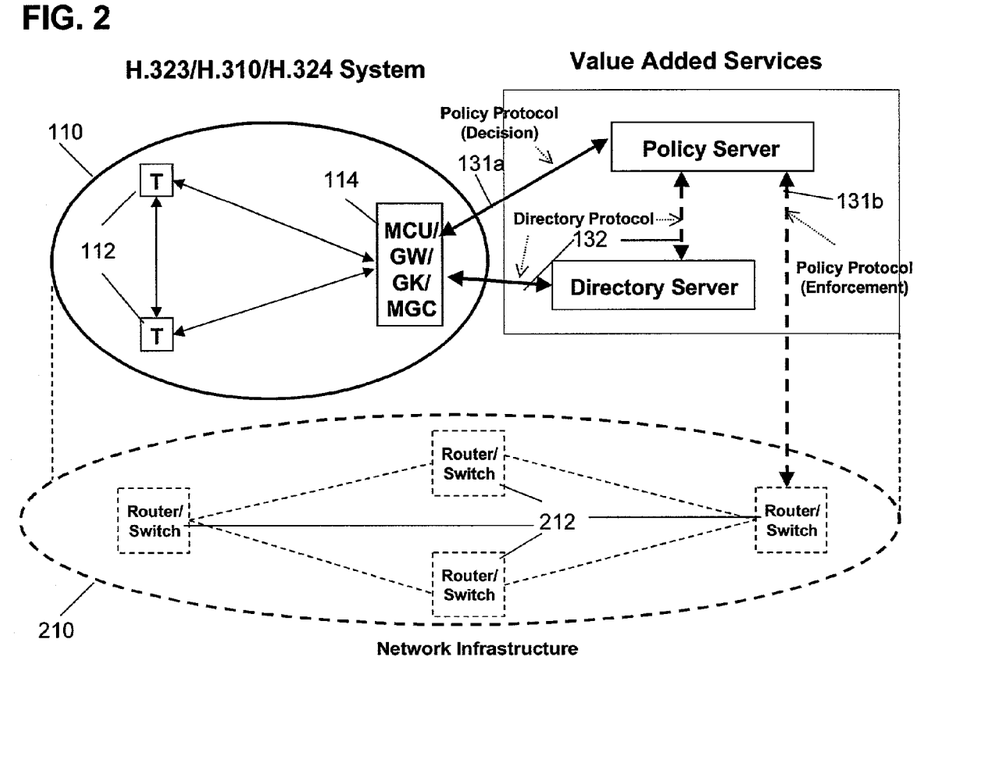
FIG. 2 is a high-level system block diagram of a multimedia application system, value-added services, and an underlying network infrastructure that shows the generic relationship between the multimedia application system, the value-added services, and the underlying network infrastructure, in accordance with an embodiment of the present invention.

In accordance with an embodiment of the present invention, FIG. 2 shows a generic high-level example of a multimedia application protocol system 110 for which value-added service protocols 131a, 131b and 132 are provided and an underlying network infrastructure 210 on which the system 110 and value-added service protocols 131a, 131b and 132 can be implemented. For the sake of consistency, structures common to FIG. 1 are identified using the original reference numbers from FIG. 1 in FIG. 2 and the subsequent figures.

In FIG. 2, the multimedia application protocol system 110 is shown to be in communication with the policy server 121 and the directory server 122 via the policy protocol 131a and the directory protocol 132, respectively. The multimedia application protocol system 110 is adapted and configured to operate exactly as previously described relative to FIG. 1. The policy server 121 and the directory server 122 are also shown to be in communication with each other via the directory protocol 132 to enable the rapid storage and retrieval of policy information. The policy server 121 is also in communication with one or more routers/switches 212 in the network infrastructure 210 via the policy protocol 132b to further enable the provision of the policy value-added service needed for call completion, call conduct and call termination.

In FIG. 2, the value-added services are shown implemented as common BES protocols that can provide their value-added services to all of the entities 112, 114 in the multimedia application protocol system 110 on any network infrastructure 210. As shown in FIG. 2, the multimedia application protocol system resides in the application layer defined by the Open System International (OSI) while the network infrastructure resides in the OSI network (for example, Internet Protocol (IP)) or link (for example, Asynchronous Transfer Mode (ATM)) layer. The policy and directory value-added services that are needed by the multimedia application protocol system 110 can also reside in the application layer. For the purposes of clarity of illustration, and in accordance with the embodiment of the present invention, in FIG. 2, it is assumed that all policy decisions are made by the policy server 121 and that the policies related to connectivity, performance, traffic, security and others can be a part of the policy server 121. Similarly, information on which of the multimedia application protocols is being used by the multimedia application protocol system 110 can be stored in the directory server 132.

In accordance with an embodiment of the present invention, the following steps can be followed to develop the policy value-added service protocol 131.

Step 1: Permit a terminal 112 of any multimedia application protocol (for example, H.323, H.310, H.324) to make a call using that specific application protocol to an existing system entity 114 (for example, a terminal, a GW, a MCU, a GK, a MGC, etc.). In general, when the call from the terminal 112 reaches a GK 114 of a given carrier network, the GK 114 can determine the destination address(es) for the call. It is possible that the call destination address(es) is/are on a different carrier network. To support this contingency, there may be a SLA between the carriers that permits the call to be routed to the other carriers' network according to a certain policy. In general, the policy can be authenticated if the user has a proper registration with a service provider; a proper billing/accounting arrangement; a proper priority to transfer the call (for example, if it is a call from the President of a company, a system administrator or an emergency call, which will have the highest priority regardless of the position of an individual in a given company); what kind of QOS needs to be offered for the call; what kind of grade-of-service (GOS) that needs to be provided without exceeding a given threshold of probability of blocking; how each media will be treated (for example, audio with highest priority, data with second highest priority, and video with lowest priority), as well as other criteria. The policy server 121 can check all items based on the SLA and, a policy token can be provided to indicate that the call has been authorized to go from a given carrier network to another carrier network. It should be noted that the same policy token can be used by all multimedia application protocols. In general, no existing multimedia application protocol has the intelligence related to the policy (for example, the above-mentioned policy token) in its signaling messages, therefore, the call signaling messages need to be augmented to include the policy related information. The extension of any multimedia application protocol to include policy information can be a part of an application-specific extension.

Step 2: If any H.323/H.310/H.324 system entity 112, 114 wants to communicate with the policy server 121, it needs to use the policy value-added service protocol 131. The policy value-added service protocol 131 can be a common protocol that can be used by any of the H.323H.310/H.324 system entities 112, 114. A directory value-added service protocol 132 can also be used between the policy server 121 and directory server 122 to retrieve all policy-related information stored in the directory server 122. As shown in FIG. 2, the policy value-added service protocol 131 can be further refined into two parts: Part 1. a Policy Decision protocol 131a, and Part 2. a Policy Enforcement protocol 131b. The policy decision part can be limited to the application layer entities like the policy server 121 and the application level system entities, for example, terminals 112, GWs 114, MCUs 114, GKs 114, MGCs 114, etc. However, enforcement of the policy implemented in the policy value-added service requires services from lower OSI network/link layer entities, for example, routers/switches 212. That is, the source-destination path(s) of the actual data flows can enforce the policies according to the decision made in the OSI application layer to meet the requirements of the application.

In general, all of the multimedia application protocols need value-added services like Policy, Directory, Security, Billing/Accounting, Visitor/Home Location Functions, and others. Thus, in accordance with an embodiment of the present invention, two steps can be used to implement the value-added service protocols including:

1. Developing application-specific extensions for each application protocol (e.g., H.323, H.310, H.324) to communicate with each value-added service.

2. Developing a common value-added service protocol that for each value-added service that can communicate with each in a protocol.

Alternatively, the above described common value-added service protocols can either: (1) extend each multimedia application protocol to include the intelligence of the value-added services among its own existing system entities in an application-specific way, since the signaling messages are specific to that particular application protocol; or (2) implement each of the common value-added service protocols with application specific interfaces to communicate with each protocol's signaling messages.

Figure 3:
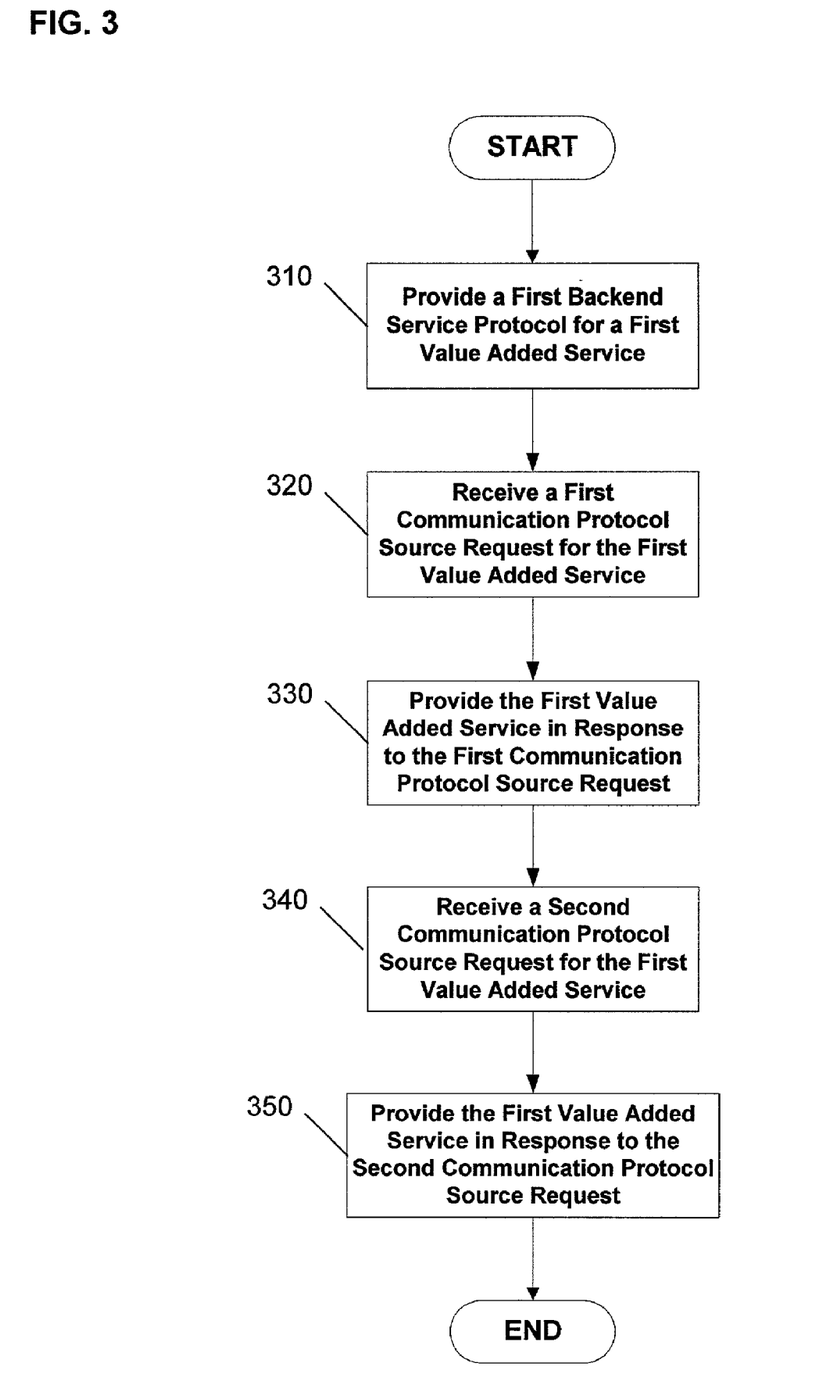
FIG. 3 is a flow chart for a method of providing common value-added services for calls originated using different communication protocols in accordance with an embodiment of the present invention.

FIG. 3 is a flow chart for a method of providing common value-added services for calls originated using different communication protocols, in accordance with an embodiment of the present invention.

In FIG. 3, in block 310, a first value-added service server can provide a first value-added service protocol to be used for requesting and providing a first value-added service. In block 320, the first value-added service server can receive a request for the first value-added service from a first communication protocol source, where the communication protocol used by the first communication protocol source can include any multimedia application protocol, such as, for example, H.323, H.310, and H.324. In block 330, the first value-added service server can provide the first value-added service to the first communication protocol source in response to the request for the first value-added service. In block 340, the first value-added service server can receive a request for the first value-added service from a second communication protocol source, where the communication protocol used by the second communication protocol source can include any multimedia application protocol, such as, for example, H.323, H.310, and H.324. In fact, the communication protocol used by the second communication protocol source can be the same as or different than the first communication protocol source. In block 350, the first value-added service server can provide the first value-added service to the second communication protocol source in response to the request for the first value-added service.

Figure 4:
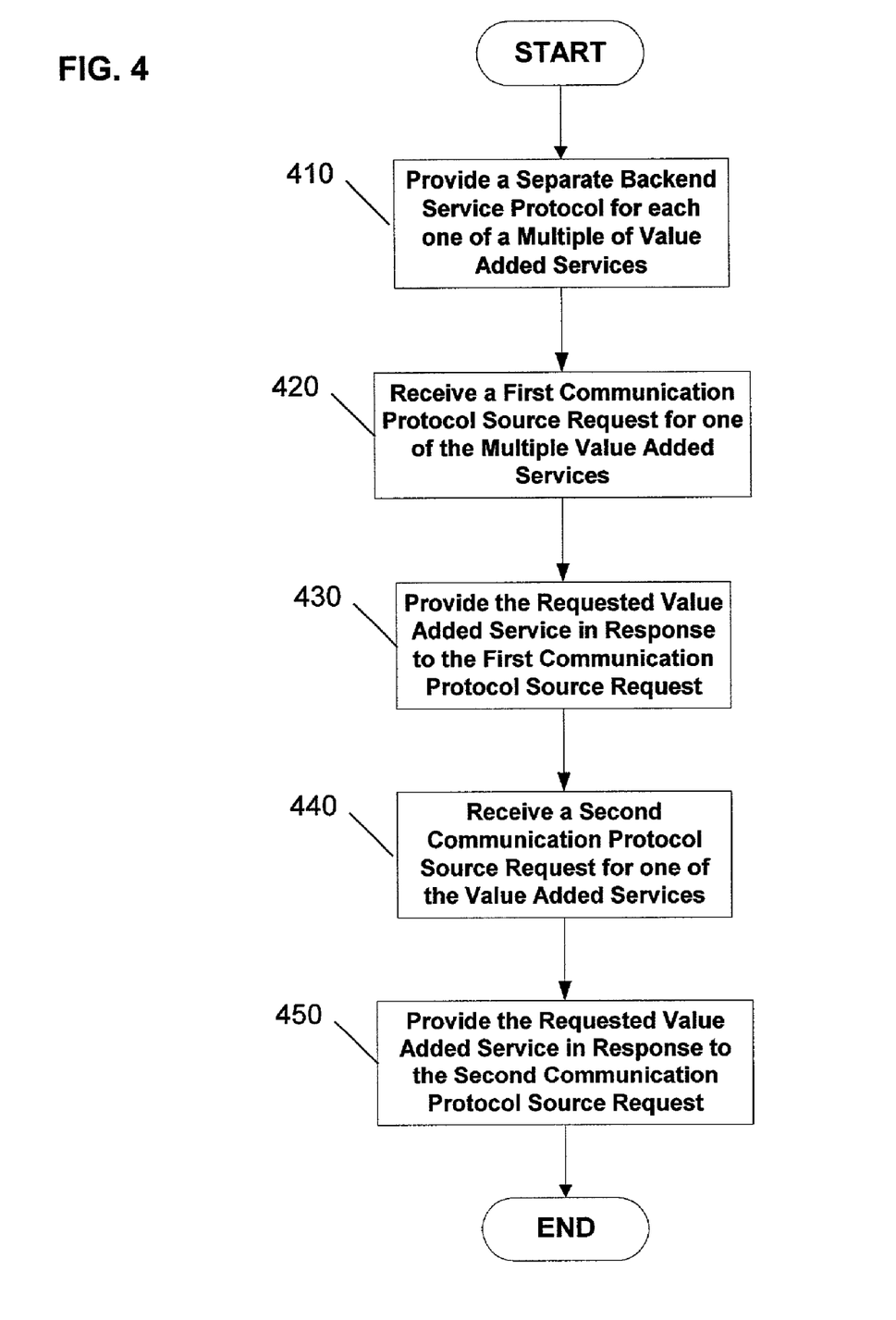
FIG. 4 is a flow chart for a method of providing common value-added services for calls originated using different communication protocols in accordance with another embodiment of the present invention.

FIG. 4 is a flow chart for a method of providing common value-added services for calls originated using different communication protocols, in accordance with another embodiment of the present invention.

In FIG. 4, in block 410, at least one value-added service server can provide separate value-added service protocols to be used for requesting and providing each one of a multiple of value-added services. In block 420, the at least one value-added service server can receive a request for one of the multiple of value-added services from a first communication protocol source, where the communication protocol used by the first communication protocol source can include any multimedia application protocol, such as, for example, H.323, H.310, and H.324. In block 430, the at least one value-added service server can provide the one value-added service to the first communication protocol source in response to the request for the one value-added service. In block 440, the at least one value-added service server can receive a request for the one value-added service from a second communication protocol source, where the communication protocol used by the second communication protocol source can include any multimedia application protocol, such as, for example, H.323, H.310, and H.324. In fact, the communication protocol used by the second communication protocol source can be the same as or different than the first communication protocol source. In block 450, the at least one value-added service server can provide the one value-added service to the second communication protocol source in response to the request for the one value-added service.

Figure 5:
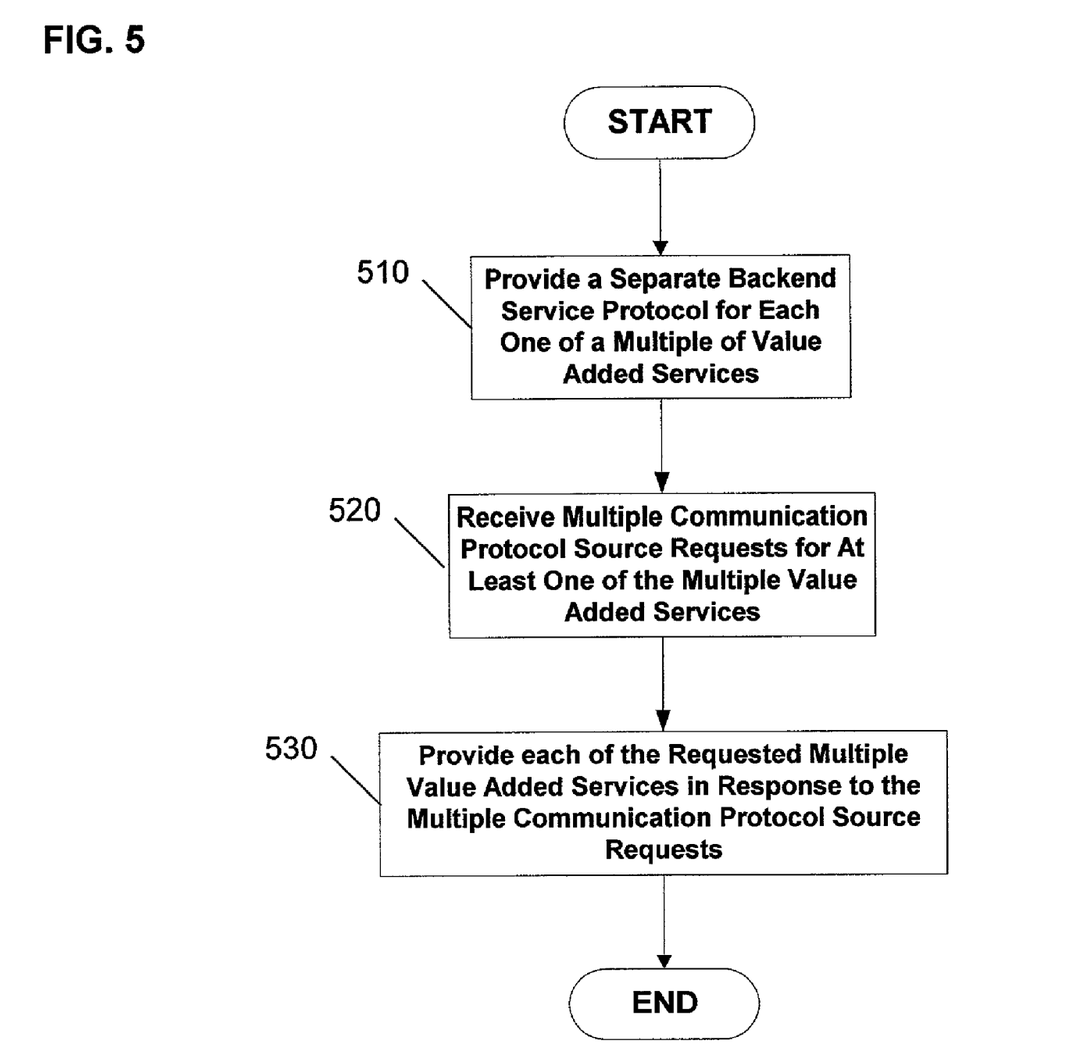
FIG. 5 is a flow chart for a method of providing common value-added services for calls originated using different communication protocols in accordance with another embodiment of the present invention.

FIG. 5 is a flow chart for a method of providing common value-added services for calls originated using different communication protocols, in accordance with another embodiment of the present invention.

In FIG. 5, in block 510, at least one value-added service server can provide separate value-added service protocols to be used for requesting and providing each one of a multiple of value-added services. In block 520, the at least one value-added service server can receive multiple requests for at least one of the multiple of value-added services from at least one communication protocol source, where the communication protocol used by the at least one communication protocol source can include any multimedia application protocol, such as, for example, H.323, H.310, and H.324. In block 530, the at least one value-added service server can provide the at least one value-added service to the at least one communication protocol source in response to the request for the at least one value-added service.

Figure 6:
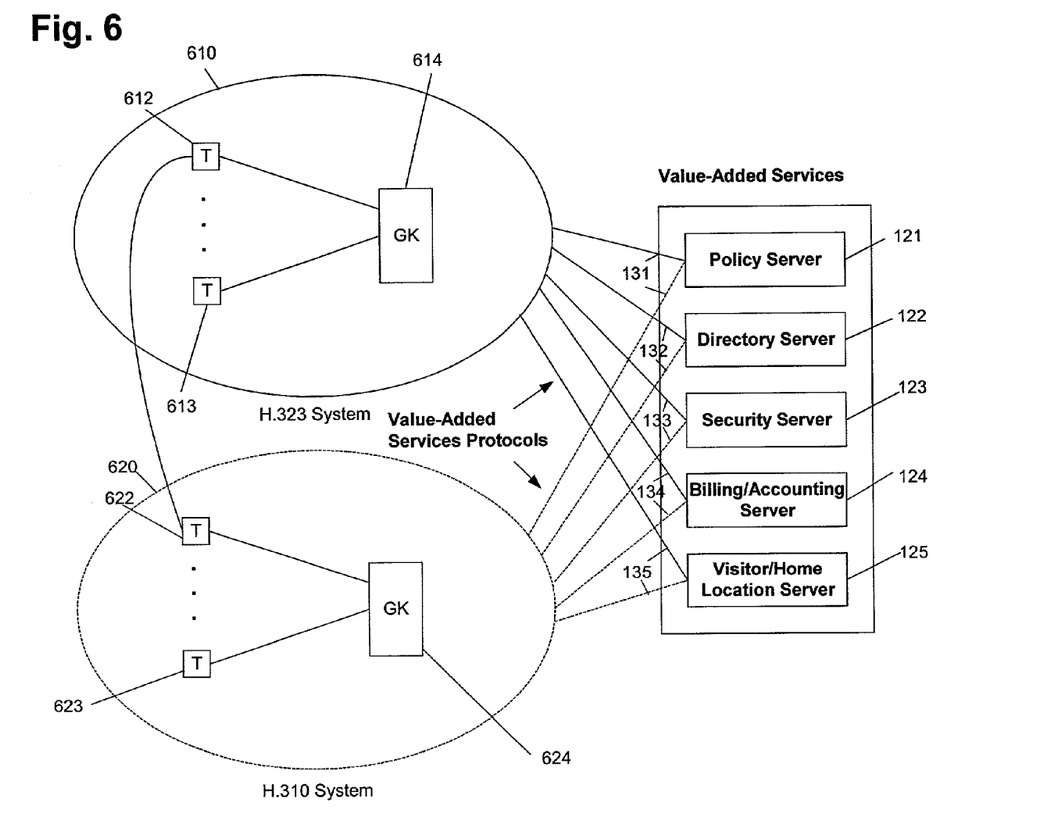
FIG. 6 is a high-level system block diagram of a multimedia application system that shows the relationship between different multimedia application protocol systems and how common value-added service protocols enable communication with common value-added services to implement two-way, real-time communications between the different multimedia application protocol systems, in accordance with an embodiment of the present invention.

FIG. 6 is a high-level system block diagram of a multimedia application system that shows the relationship between different multimedia application protocol systems and how common value-added service protocols enable communication with common value-added services to implement two-way point-to-point, multi-point-to-multi-point, point-to-multi-point, and/or multi-point-to-point real-time communications between the different multimedia application protocol systems, in accordance with an embodiment of the present invention.

In accordance with an embodiment of the present invention, in FIG. 6, an H.323 multimedia application protocol system 610 is shown to include one or more terminals 612, 613 and a GK 614 in communication with each other and multiple value-added service servers 121–125. Specifically, in FIG. 6, the policy server 121 is shown to be in communication with the multimedia application protocol system 610 via the policy value-added service protocol 131, the directory server 122 is shown to be in communication with the multimedia application protocol system 610 via the directory value-added service protocol 132, the security server 123 is shown to be in communication with the multimedia application protocol system 610 via the security value-added service protocol 133, the billing/accounting server 124 is shown to be in communication with the multimedia application protocol system 610 via the billing/accounting value-added service protocol 134, and the visitor/home location server 125 is shown to be in communication with the multimedia application protocol system 610 via the visitor/home location value-added service protocol 135.

In addition to the H.323 multimedia application protocol system 610 an H.310 multimedia application protocol system 620 is shown to include one or more terminals 622, 623 and a GK 624 in communication with each other to and with the value-added services servers 121–125 via the value-added service protocols 131–135 in the same manner as the H.323 multimedia application protocol system 610. As shown in FIG. 6, the H.322 terminal 612 is shown to be in communication with the H.310 terminal 622 as a result of the common value-added service protocols 131–135, which enable the provision of the necessary functionality and resources at the OSI application level.

In accordance with an embodiment of the present invention, a method of providing common value-added services for two-way point-to-point, multi-point-to-multi-point, point-to-multi-point, and/or multi-point-to-point real-time communications using various communication protocols includes receiving a request from a first of a multiple of communication protocol sources for a first value-added service using a first common value-added service protocol, and providing the requested first value-added service to the first communication protocol source using the first common value-added service protocol. The method further includes receiving a request from a second of the multiple communication protocol sources for the first value-added service using the first common value-added service protocol, and providing the requested first value-added service to the second communication protocol source using the first common value-added service protocol.

In accordance with an embodiment of the present invention, a method of providing common value-added services for two-way point-to-point, multi-point-to-multi-point, point-to-multi-point, and/or multi-point-to-point real-time communications using various communication protocols includes receiving multiple requests from multiple first communication protocol sources for a first value-added service using a first of a multiple of common value-added service protocols, and providing the first value-added service to each of the multiple first communication protocol sources using the first of the multiple common value-added service protocols. The method further includes receiving multiple requests from multiple second communication protocol sources for the first value-added service using the first of the multiple common value-added service protocols, and providing the first value-added service to each of the multiple second communication protocol sources using the first of the multiple value-added service protocols.

In accordance with an embodiment of the present invention, a machine-readable medium (for example, a computer-readable medium and an Application Specific Integrated Circuit (ASIC)) has stored therein an executable computer program for receiving a request from a first of a multiple of communication protocol sources for a first value-added service using a first common value-added service protocol, and providing the requested first value-added service to the first communication protocol source using the first common value-added service protocol. The computer program further performs the steps including receiving a request from a second of the multiple communication protocol sources for the first value-added service using the first common value-added service protocol, and providing the requested first value-added service to the second communication protocol source using the first common value-added service protocol.

In accordance with an embodiment of the present invention, a server system for providing common value-added services for two-way point-to-point, multi-point-to-multi-point, point-to-multi-point, and/or multi-point-to-point real-time communications using various communication protocols includes at least one value-added service server, where the at least one value-added service server can be adapted and configured to provide at least one common value added service in response to a request for the at least one common value added service. The server system also including a machine-readable medium having stored therein an executable computer program for receiving a request from a first of a multiple of communication protocol sources for a first value-added service using a first common value-added service protocol, and providing the requested first value-added service to the first communication protocol source using the first common value-added service protocol. The computer program further performs the steps including receiving a request from a second of the multiple communication protocol sources for the first value-added service using the first common value-added service protocol, and providing the requested first value-added service to the second communication protocol source using the first common value-added service protocol.

In accordance with another embodiment of the present invention, a method of providing common value-added services for two-way point-to-point, multi-point-to-multi-point, point-to-multi-point, and/or multi-point-to-point real-time, multimedia communications using multiple communication protocols includes receiving a request from a first communication protocol source for a first of a multiple of value-added services using a common value-added service protocol, and providing the first value-added service to the first communication protocol source using the common value-added service protocol. The method further includes receiving a request from the first communication protocol source for a second of the multiple value-added services using the common value-added service protocol, and providing the second value-added service to the first communication protocol source using the common value-added service protocol.

In accordance with another embodiment of the present invention, a method of providing common value-added services for two-way point-to-point, multi-point-to-multi-point, point-to-multi-point, and/or multi-point-to-point real-time, multimedia communications using a plurality of multimedia communication protocols includes receiving a first multimedia communication protocol request for a first of a multiple of value-added services using a common value-added service protocol, and providing the first value-added service in response to the first multimedia communication protocol request using the common value-added service protocol. The method also includes receiving a second multimedia communication protocol request for a first of the multiple value-added services using the common value-added service protocol, and providing the second value-added service in response to the second multimedia communication protocol request using the common value-added service protocol.

A method and system for providing common value-added services for two-way point-to-point, multi-point-to-multi-point, point-to-multi-point, and/or multi-point-to-point real-time communications, for accessing value-added services from all multimedia application protocols have been described with reference to specific examples. While several embodiments of the present invention have been described above, other embodiments are possible that remain within the spirit and scope of the present invention as set forth in the appended claims. The specification and the drawings are accordingly to be regarded as illustrative rather than in a restrictive sense.

What is claimed is:

1. A method of providing common value-added services for two-way point-to-point, multi-point-to-multi-point, point-to-multi-point, and/or multi-point-to-point real-time communications using various communication protocols, the method comprising:

receiving a request from a first of a plurality of communication protocol sources for a first value-added service using a first common value-added service protocol, the first common value-added service protocol adapted to communicate information regarding a value added service selected from a Policy service, a Security service, a Billing/Accounting service, and a Visitor/Home Location service, the first common value-added service protocol adapted to communicatively interface with H.323 protocol, H.310 protocol, and H.324 protocol;

providing the requested first value-added service to the first communication protocol source using said first common value-added service protocol;

receiving a request from a second of said plurality of communication protocol sources for the first value-added service using said first common value-added service protocol; and providing the requested first value-added service to the second communication protocol source using said first common value-added service protocol.

2. The method as defined in claim 1, wherein the requests received from the first and second communication protocol sources being identical in format at an application layer level, and the first and second communication protocol sources being different in format at a transport layer level.

3. The method as defined in claim 1, further comprising:
receiving a request from the first communication protocol source for a second value-added service using a second common value-added service protocol; and providing the requested second value-added service to the first communication protocol source using said second common value-added service protocol.

4. The method as defined in claim 3, further comprising:
receiving a request from the second communication protocol source for the second value-added service using said second common value-added service protocol; and providing the requested second value-added service to the second communication protocol source using said second common value-added service protocol.

5. The method as defined in claim 1, wherein both of said first communication protocol source and said second communication protocol source operate using the same one of an H.323 protocol, an H.310 protocol and an H.324 protocol.

6. The method as defined in claim 5, wherein said first communication protocol source is one of a user terminal, a media gateway controller (MGC), a gatekeeper (GK), a multi-point control unit (MCU), and a gateway (GW).

7. The method as defined in claim 1, wherein each of said first communication protocol source and said second communication protocol source operates using a different one of an H.323 protocol, an H.310 protocol, and an H.324 protocol.

8. The method as defined in claim 7, wherein said first communication protocol source is one of a user terminal, a media gateway controller (MGC), a gatekeeper (GK), a multi-point control unit (MCU), and a gateway (GW).

9. The method as defined in claim 1, wherein said first communication protocol source is one of a user terminal, a media gateway controller (MGC), a gatekeeper (GK), a multi-point control unit (MCU), and a gateway (GW).

10. The method as defined in claim 1, wherein said first common value-added service protocol is one of a policy service protocol, a directory service protocol, a security service protocol, a billing/accounting service protocol, and a visitor/home location service protocol.

11. The method as defined in claim 10, wherein said second common value-added service protocol is different than said first common value-added service protocol and is one of a policy service protocol, a directory service protocol, a security service protocol, a billing/accounting service protocol, and a visitor/home location service protocol.

12. The method as defined in claim 1, wherein said second common value-added service protocol is different than said first common value-added service protocol and is one of a policy service protocol, a directory service protocol, a security service protocol, a billing/accounting service protocol, and a visitor/home location service protocol.

13. A method of providing common value-added services for two-way point-to-point, multi-point-to-multi-point, point-to-multi-point, and/or multi-point-to-point real-time communications using various communication protocols, the method comprising:

receiving a plurality of requests from a plurality of first communication protocol sources for a first value-added service using a first of a plurality of common value-added service protocols, the first common value-added service protocol adapted to communicate information regarding a value added service selected from a Policy service, a Security service, a Billing/Accounting service, and a Visitor/Home Location service, the first common value-added service protocol adapted to communicatively interface with H.323 protocol, H.310 protocol, and H.324 protocol;

providing the first value-added service to each of the plurality of first communication protocol sources using said first of said plurality of common value-added service protocols;

receiving a plurality of requests from a plurality of second communication protocol sources for said first value-added service using said first of said plurality of common value-added service protocols; and providing the first value-added service to each of the plurality of second communication protocol sources using said first of said plurality of value-added service protocols.

14. The method as defined in claim 13, wherein said first of said plurality of communication protocol sources operates using one of an H.323 protocol, an H.310 protocol and an H.324 protocol.

15. The method as defined in claim 14, wherein said first of said plurality of communication protocol sources is one of a user terminal, a media gateway controller (MGC), a gatekeeper (GK), a multi-point control unit (MCU), and a gateway (GW).

16. The method as defined in claim 13, wherein said first of said plurality of communication protocol sources is one of a user terminal, a media gateway controller (MGC), a gatekeeper (GK), a multi-point control unit (MCU), and a gateway (GW).

17. The method as defined in claim 13, wherein each of said plurality of common value-added service protocols is different from each of the other plurality of common value-added service protocols and is one of a policy service protocol, a directory service protocol, a security service protocol, a billing/accounting service protocol, and a visitor/home location service protocol.

18. A machine-readable medium having stored therein a computer program for providing common value-added services for two-way point-to-point, multi-point-to-multi-point, point-to-multi-point, and/or multi-point-to-point real-time communications using various communication protocols, said computer program, which when executed performs the steps comprising:

receiving a request from a first of a plurality of communication protocol sources for a first value-added service using a first common value-added service protocol, the first common value-added service protocol adapted to communicate information regarding a value added service selected from a Policy service, a Security service, a Billing/Accounting service, and a Visitor/Home Location service, the first common value-added service protocol adapted to communicatively interface with H.323 protocol, H.310 protocol, and H.324 protocol;

providing the requested first value-added service to the first communication protocol source using said first common value-added service protocol;

receiving a request from a second of said plurality of communication protocol sources for the first value-added service using said first common value-added service protocol; and providing the requested first value-added service to the second communication protocol source using said first common value-added service protocol.

19. The computer program as defined in claim 18, which when executed further performs the steps comprising:

receiving a request from the first communication protocol source for a second value-added service using a second common value-added service protocol; and providing the requested second value-added service to the first communication protocol source using said second common value-added service protocol.

20. The computer program as defined in claim 19, which when executed further performs the steps comprising:

receiving a request from the second communication protocol source for the second value-added service using said second common value-added service protocol; and providing the requested second value-added service to the second communication protocol source using said second common value-added service protocol.

21. The computer program as defined in claim 18, wherein both of said first communication protocol source and said second communication protocol source operate using the same one of an H.323 protocol, an H.310 protocol and an H.324 protocol.

22. The computer program as defined in claim 21, wherein said first communication protocol source is one of a user terminal, a media gateway controller (MGC), a gatekeeper (GK), a multi-point control unit (MCU), and a gateway (GW).

23. The computer program as defined in claim 18, wherein each of said first communication protocol source and said second communication protocol source operates using a different one of an H.323 protocol, an H.310 protocol and an H.324 protocol.

24. The computer program as defined in claim 23, wherein said first communication protocol source is one of a user terminal, a media gateway controller (MGC), a gatekeeper (GK), a multi-point control unit (MCU), and a gateway (GW).

25. The computer program as defined in claim 18, wherein said first communication protocol source is one of a user terminal, a media gateway controller (MGC), a gatekeeper (GK), a multi-point control unit (MCU), and a gateway (GW).

26. The computer program as defined in claim 18, wherein said first common value-added service protocol is one of a policy service protocol, a directory service protocol, a security service protocol, a billing/accounting service protocol, and a visitor/home location service protocol.

27. The computer program as defined in claim 26, wherein said second common value-added service protocol is different than said first common value-added service protocol and is one of a policy service protocol, a directory service protocol, a security service protocol, a billing/accounting service protocol, and a visitor/home location service protocol.

28. The computer program as defined in claim 18, wherein said second common value-added service protocol is different than said first common value-added service protocol and is one of a policy service protocol, a directory service protocol, a security service protocol, a billing/accounting service protocol, and a visitor/home location service protocol.

29. A server system for providing common value-added services for two-way point-to-point, multi-point-to-multi-point, point-to-multi-point, and/or multi-point-to-point real-time communications using various communication protocols, said server system comprising:

at least one value-added service server, said at least one value-added service server being adapted and configured to provide at least one common value added service in response to a request for the at least one common value added service; and a computer program for providing common value-added services for two-way point-to-point, multi-point-to-multi-point, point-to-multi-point and/or multi-point-to-point real-time communications using various communication protocols, said computer program, which when executed performs the steps including:

receiving a request from a first of a plurality of communication protocol sources for a first value-added service using a first common value-added service protocol, the first common value-added service protocol adapted to communicate information regarding a value added service selected from a Policy service, a Security service, a Billing/Accounting service, and a Visitor/Home Location service, the first common value-added service protocol adapted to communicatively interface with H.323 protocol, H.310 protocol, and H.324 protocol;

providing the requested first value-added service to the first communication protocol source using said first common value-added service protocol;

receiving a request from a second of said plurality of communication protocol sources for the first value-added service using said first common value-added service protocol; and providing the requested first value-added service to the second communication protocol source using said first common value-added service protocol.

30. The server system as defined in claim 29, wherein said plurality of first communication protocol sources and said plurality of second communication protocol sources operate using the same one of an H.323 protocol, an H.310 protocol and an H.324 protocol.

31. The server system as defined in claim 30, wherein said plurality of first communication protocol sources includes at least one of a user terminal, a media gateway controller (MGC), a gatekeeper (GK), a multi-point control unit (MCU), and a gateway (GW).

32. The server system as defined in claim 29, wherein said plurality of first communication protocol sources and said plurality of second communication protocol sources operate using a different one of an H.323 protocol, an H.310 protocol and an H.324 protocol.

33. The server system as defined in claim 32, wherein said plurality of first communication protocol sources includes at least one of a user terminal, a media gateway controller (MGC), a gatekeeper (GK), a multi-point control unit (MCU), and a gateway (GW).

34. The server system as defined in claim 29, wherein said plurality of common value added service servers includes at least two of a policy server, a directory server, a security server, a billing/accounting server and a visitor/home location server.

* * * * *